Feb. 28, 1961 F. M. GOEHRING 2,972,851
PECAN GATHERER
Filed Dec. 17, 1957

Frederick M. Goehring
INVENTOR.

BY *Clarence A. O'Brien*
*and Harvey B. Jacobson*
Attorneys

United States Patent Office 2,972,851
Patented Feb. 28, 1961

2,972,851
PECAN GATHERER
Frederick M. Goehring, 110 Henry St., Cuero, Tex.
Filed Dec. 17, 1957, Ser. No. 703,317
3 Claims. (Cl. 56—328)

This invention relates to a handle-equipped gathering device for objects and has reference in particular to a long-handled implement which is such in construction that a user thereof may traverse a ground or surface covered with pecans or similar nuts and, while doing so, may conveniently pick the same up and accumulate them in a simple collector or cage to be readily dumped into a bag or other container.

As the opening statement of the invention implies nut and similar gathering devices having pick-up elements and members of one type or another are quite old. As a matter of fact, picking up and gathering pecans is a problem which has existed for years on end and many working in this line of invention have attempted to devise a construction which can be used to expeditiously gather and trap pecans of many and varied sizes and kinds. In the area in which applicant is operating pecans called Mahan are grown. These are about two inches long and pecan pick-up devices which have been offered by others to do the job have not, so far as is known, worked satisfactorily. One objective here is to meet the challenge which has long existed and to provide a construction which, it is believed, will handle all types of pecans, walnuts and almost all types of nuts effectually.

With a view toward achieving the results desired a handle of suitable length is bracketed to a substantially rectangular metal or an equivalent frame. The transverse ends of the frame are provided with a plurality of depending U-shaped wire members whose limbs have their upper ends affixed to the end members of the frame. The side or longitudinal frame members are provided with individual resilient limbs and these are disposed in close spaced parallel relationship and have their lower ends bent and the bent portions form fingers. The fingers are directed upwardly in a slightly convergent relationship and have their free ends spaced apart to provide a restricted entrance opening or mouth. The resiliency and adaptability of the thus constructed and associated fingers provides the structural achievement which makes possible the efficiency and reliability of operation of this novel pick-up implement.

Novelty is also predicated upon lacing or tying the U-shaped wire members and also the bendably resilient fingers together so that an openwork trapping cage is thus had.

Other objects, features and advantages will become more readily apparent from the following description and the accompanying drawing.

In the drawing, wherein like numerals are employed to designate like parts throughout the views.

Figure 1:
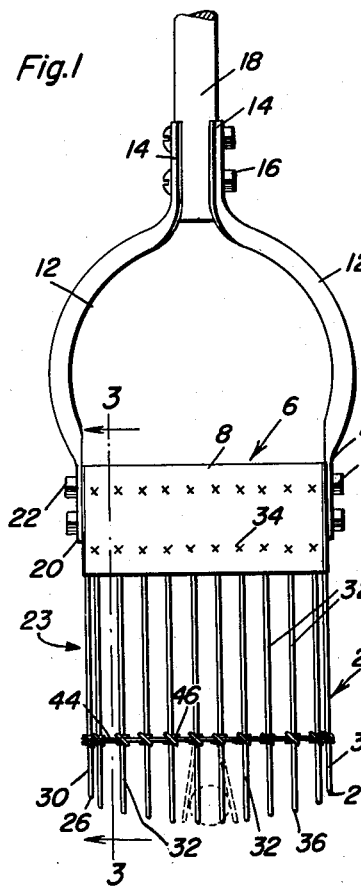
Fig. 1 is a side elevational view of a pecan pick-up and gathering implement constructed in accordance with the principles of the present invention, the handle being broken away and fragmentarily shown.
Figure 2:
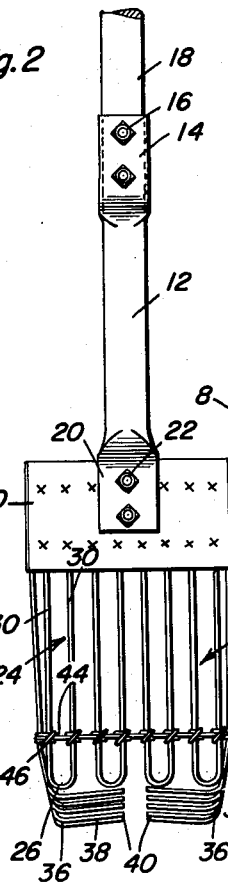
Fig. 2 is an end elevational view of the same.

Referring now to the drawing with the aid of lead lines and reference numerals the unit 6 comprises a simple rectangular sheet metal frame, the longitudinal walls 8 being at right angles to the transverse end or connecting walls 10. Appropriate brackets 12 are paired and disposed opposite each other and have their upper end portions 14 bolted at 16 to the lower end portion of the handle 18. The lower ends 20 of the brackets are bolted at 22 to the transverse walls 8.

Figure 3:
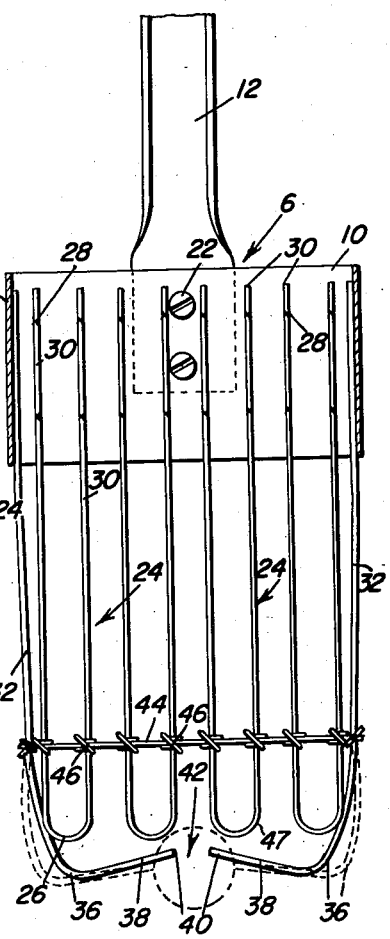
Fig. 3 is an enlarged view taken approximately on the plane of the vertical line 3—3 of Fig. 1 looking in the direction of the arrows.
Figure 4:
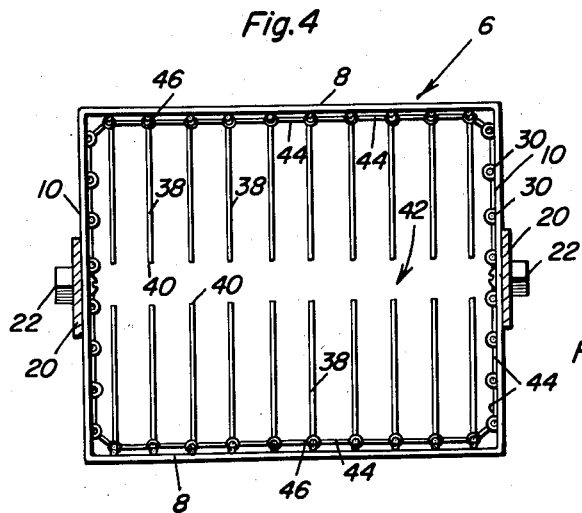
Fig. 4 is a horizontal section through the construction seen in Fig. 1.

The trapping cage 23 is of openwork construction. The transverse end portions of the cage are made up of a plurality of depending U-shaped wires or wire members 24. That is to say these wire members are arranged in coplanar relationship with their lower or bight portions 26 disposed downwardly as seen in Fig. 3. The spaced upper ends of the arms 30 thereof are welded to the interior surfaces of the end walls 10 as at 28.

The longitudinal side portions of the cage are constructed by way of individual depending resilient wire limbs 32. These limbs are disposed in spaced apart relationship and the upper ends are likewise welded in place, as at 34. The important thing to note is that the lower ends of the individual limbs are bent arcuately at 36 and then laterally and provide fingers 38. The fingers have their free terminals ends spaced apart at 40 to define an entrance mouth or slot 42. That is to say, the fingers at one side of the cage have their free ends spaced away from the free ends of the fingers at the relatively opposite side, thus providing the intervening space or slot 42. It follows that these fingers are free to "play" in directions toward and from each other as shown in dotted lines in Fig. 1. Also, they may spread apart and distort in more or less non-descript ways fashion so that it is possible to pick up pecans and nuts whether they are lying lengthwise in alignment with the slot 42, crosswise of the slot, or at some intermediate angle.

As a result of an expenditure of time and experimentation in handling every reasonably conceivable construction the one herein shown and recommended for use is by far the best, it is believed, which has even been offered or adopted for picking up pecans of all shapes and sizes. The final result is also made more efficient by the use of a cord or equivalent flexible lace 44 which is tied as at 46 to the lower end portions 47 of the individual arms and limbs so that they are thus tied together and yet are sufficiently flexible to do the work intended.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pecan pickup and gathering implement comprising, in combination, a rigid frame having transverse end members connected by longitudinal side members, a handle of requisite length, means rigidly connecting the lower end of the handle to the frame, an openwork pecan pick up and gathering cage embodying a plurality of flexibly resilient wire members disposed in spaced apart parallelism and depending vertically from and attached to the respective side and end members of the frame and having their lower end portions connected by a flexible cord associated with and cooperatively attached to individual wire members, the wire members at the transverse ends of the frame being substantially U-shaped in form and having arms the upper ends of which are rigidly attached to interior surfaces of the transverse end members, and the wire members along the longitudinal sides of said frame comprising individual resilient limbs attached at upper ends to said side members and having lower ends depending below the lower bight portions of the U-shaped wire members and directed inwardly and upwardly and providing converging fingers having free terminals, the terminals of the converging fingers along one longitudinal side of the cage being spaced from cooperating terminals of the fingers along the relatively opposite longitudinal side and providing an entrance slot between themselves and said slot widening and opening to feed the pecans into the receptacle portion of the cage and automatically closing to prevent the pecans from dropping out of the cage.

2. The structure defined in claim 1 and wherein all of the terminals of the wire members being disposed in a plane below the plane of the lower ends of the U-shaped members and the lower ends of all of said U-shaped members being in a common plane.

3. A pecan pickup and gathering implement comprising a rigid frame having transverse end members and longitudinal side members, a handle having a lower end portion and means connecting the lower end portion to the transverse end members of said frame, a plurality of coplanar wire members U-shaped in form and having elongated resilient arms the upper ends of which are rigidly attached to interior surfaces of the transverse end members, said U-shaped members having curved bight portions at their lower ends and said bight portions all terminating in a common plane, a plurality of individual resilient wires providing coplanar limbs disposed in spaced parallelism and having upper end portions joined to the interior surfaces of the longitudinal side members of said frame, said limbs having lower end portions depending below the bight portions of the U-shaped members and provided with inwardly and upwardly directed fingers, said fingers having free end portions and said free end portions of the fingers at one side of the frame being opposed to but spaced from the free end portions of the fingers along the other longitudinal side of the frame and the fingers at the respective longitudinal sides of the frame being disposed in upwardly converging relationship and being free to flex in varying directions to lend themselves adaptable to ever varying pecan size and pickup contingencies and conditions.

References Cited in the file of this patent

UNITED STATES PATENTS

| | | |
|---|---|---|
| 667,580 | Rogers | Feb. 5, 1901 |
| 698,226 | Roberts | Apr. 22, 1902 |
| 1,658,145 | Uyei | Feb. 7, 1928 |
| 2,788,630 | Nisbet | Apr. 16, 1957 |
| 2,835,099 | Touchberry | May 20, 1958 |

FOREIGN PATENTS

| | | |
|---|---|---|
| 24,322 | Great Britain | 1901 |
| 33,440 | Sweden | Sept. 27, 1910 |